(12) United States Patent
Awada et al.

(10) Patent No.: US 11,785,512 B2
(45) Date of Patent: Oct. 10, 2023

(54) FALLBACK TO CONDITIONAL HANDOVER USING SSB REFERENCE SIGNAL

(71) Applicant: Nokia Technologies OY, Espoo (FI)

(72) Inventors: Ahmad Awada, Munich (DE); Christian Rom, Aalborg (DK); Samantha Caporal Del Barrio, Aalborg (DK); Ingo Viering, Munich (DE); Jedrzej Stanczak, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 25 days.

(21) Appl. No.: 17/391,370

(22) Filed: Aug. 2, 2021

(65) Prior Publication Data

US 2023/0036845 A1 Feb. 2, 2023

(51) Int. Cl.
*H04W 36/00* (2009.01)
*H04W 56/00* (2009.01)

(52) U.S. Cl.
CPC . *H04W 36/00837* (2018.08); *H04W 36/0016* (2013.01); *H04W 36/0058* (2018.08); *H04W 56/001* (2013.01)

(58) Field of Classification Search
CPC ........... H04W 36/00837; H04W 36/36; H04W 48/12; H04W 36/08; H04W 36/0083; H04W 36/0016; H04W 36/0058; H04W 36/0094; H04W 48/20; H04W 56/001
See application file for complete search history.

(56) References Cited

U.S. PATENT DOCUMENTS

| | | | | |
|---|---|---|---|---|
| 2020/0100297 | A1* | 3/2020 | Agiwal | H04W 24/08 |
| 2020/0274606 | A1* | 8/2020 | Kang | H04W 74/0833 |
| 2020/0275319 | A1* | 8/2020 | Murray | H04W 36/0005 |
| 2021/0168678 | A1* | 6/2021 | Deenoo | H04W 36/0085 |

* cited by examiner

*Primary Examiner* — Quoc Thai N Vu
(74) *Attorney, Agent, or Firm* — Harness, Dickey & Pierce, P.L.C.

(57) ABSTRACT

In a system, apparatus, method, and non-transitory computer readable medium for implementing fallback to conditional handover using a SSB reference signal, a UE device may be caused to, receive RRC reconfiguration information from a source RAN node, the RRC reconfiguration information including a SSB RS based CHO execution condition associated with at least one target cell controlled by a target RAN node, and a CSI-RS based CHO execution condition associated with the target cell(s), perform signal measurements of at least one SSB RS and at least one CSI-RS associated with the target cell(s), the at least one CSI-RS associated with a contention-free random access resource, and perform the CHO with the target cell(s) based on the signal measurement results of the at least one SSB RS, the at least one CSI-RS, the SSB based CHO execution condition, and the CSI-RS based CHO execution condition.

20 Claims, 8 Drawing Sheets

FALLBACK TO CONDITIONAL HANDOVER USING SSB REFERENCE SIGNAL

BACKGROUND

Field

Various example embodiments relate to methods, apparatuses, systems, and/or non-transitory computer readable media for providing fallback to conditional handover using synchronization signal block (SSB) reference signals.

Description of the Related Art

A $5^{th}$ generation mobile network (5G) standard, referred to as 5G New Radio (NR), is being developed to provide higher capacity, higher reliability, and lower latency communications than the 4G long term evolution (LTE) standard.

With regards to the higher reliability goals of the 5G NR standard, the 5G NR standard provides user equipment (UE) devices (hereinafter referred to as UE devices or UEs) with a baseline handover protocol wherein a source radio access network (RAN) node, e.g., the RAN node that the UE device is connected to and/or communicating with, will cause the UE device to send a measurement report regarding current signal strength and/or signal quality (e.g., cell quality measurement) between the source RAN node and the UE device and/or between neighboring target RAN nodes and the UE device. If the signal metrics of the measurement report fail to satisfy and/or meet desired connection threshold conditions, the source RAN node transmits a handover request to one or more of the neighboring target RAN nodes, and transmits a radio resource control (RRC) reconfiguration (e.g., a handover command) to the UE device instructing the UE device to connect to a target cell of the target RAN node. The UE device will then immediately connect to the target cell to complete the handover.

However, the timing for initiating the baseline handover is difficult and/or challenging and may lead to radio link failures (RLFs), handover failures, etc. This is because the handover must be initiated during a time window and geographical window where the UE device can still receive the RRC reconfiguration from the source RAN node, but at the same time the UE device must be able to perform a successful random access to the target cell of the target RAN node. Accordingly, the UE device may experience RLF, decreased throughput, decreased signal quality, handover failures, and/or other disruptions in its connection to the wireless network while the handover operation is being performed.

SUMMARY

At least one example embodiment may be related to a user equipment (UE) device.

In at least one example embodiment, the UE device may include a memory storing computer readable instructions, and processing circuitry configured to execute the computer readable instructions to cause the device to, receive radio resource control (RRC) reconfiguration information from a source radio access network (RAN) node, the RRC reconfiguration information including a synchronization signal block (SSB) reference signal (RS) based conditional handover (CHO) execution condition associated with at least one target cell controlled by a target RAN node, and a channel state information reference signal (CSI-RS) based CHO execution condition associated with the at least one target cell, perform signal measurements of at least one SSB RS and at least one CSI-RS associated with the at least one target cell, the at least one CSI-RS associated with a contention-free random access resource, and perform the CHO with the at least one target cell based on the signal measurement results of the at least one SSB RS, the at least one CSI-RS, the SSB based CHO execution condition, and the CSI-RS based CHO execution condition.

Some example embodiments provide that the device is further caused to determine whether the signal measurement results of the at least one CSI-RS satisfies the CSI-RS CHO execution condition, measure signal received power or signal quality of the at least one CSI-RS of the at least one target cell in response to results of the determination indicating that the CSI-RS based CHO execution condition is satisfied, and determine whether the measured signal received power or signal quality of the at least one CSI-RS satisfies a CSI-RS based random access condition.

Some example embodiments provide that the device is further caused to determine whether the signal measurement results of the CSI-RS CHO execution condition is satisfied further includes determining whether the signal measurement results of the at least one CSI-RS satisfies the CSI-RS CHO execution condition before the signal measurement results of the at least one SSB RS satisfies the SSB CHO based execution condition.

Some example embodiments provide that the CSI-RS based random access condition is at least one of a desired signal received power threshold value or a desired signal quality threshold value.

Some example embodiments provide that the device is further caused to perform the CHO by performing random access of the at least one target cell using the at least one CSI-RS in response to results of the determination indicating the measured signal received power or signal quality of the at least one CSI-RS satisfies the CSI-RS random access condition.

Some example embodiments provide that, in response to the results of the determination indicating the measured signal received power or signal quality of the at least one CSI-RS do not satisfy the CSI-RS based random access condition, the device is further caused to determine whether the signal measurement results of the at least one SSB RS satisfies the SSB based CHO execution condition, and perform the CHO by performing random access of the at least one target cell using at least one SSB corresponding to the at least one target cell in response to results of the determination indicating the SSB based CHO execution condition is satisfied.

Some example embodiments provide that the device is further caused to determine whether the signal measurement results of the at least one SSB RS satisfies the SSB based CHO execution condition before the signal measurement results of the at least one CSI-RS satisfies the CSI-RS based CHO execution condition, identify at least one SSB RS which corresponds to a subset of the SSB RS measurements for the target cell when the SSB based CHO execution condition is met, and determine whether the identified at least one SSB RS satisfies a SSB RS based random access condition.

Some example embodiments provide that the SSB RS based random access condition is the at least one SSB RS not being associated with a configured CSI-RS, or a signal received power or signal quality value of the CSI-RS associated with the at least one SSB RS is less than a desired threshold value.

Some example embodiments provide that the device is further caused to perform the CHO by performing random access of the at least one target cell in response to results of the determination indicating the at least one SSB RS satisfies the SSB RS based random access condition.

Some example embodiments provide that, in response to the results of the determination indicating none of the identified SSB RS satisfies the SSB RS based random access condition, the device is further caused to determine whether the signal measurements of the at least one CSI-RS satisfies the CSI-RS based CHO execution condition, and perform the CHO by performing random access of the at least one target cell in response to results of the determination indicating that the CSI-RS based CHO execution condition is satisfied.

At least one example embodiment may be related to a radio access network (RAN) node.

In at least one example embodiment, the RAN node may include a memory storing computer readable instructions, and processing circuitry configured to execute the computer readable instructions to cause the node to, receive a measurement report from at least one user equipment (UE) device, transmit conditional handover (CHO) information to at least one target RAN node, and transmit radio resource control (RRC) reconfiguration information to the at least one UE device, the RRC reconfiguration information including a synchronization signal block (SSB) reference signal (RS) based CHO execution condition associated with at least one target cell that is controlled by the at least one target RAN node, and a channel state information reference signal (CSI-RS) based CHO execution condition associated with the at least one target cell.

Some example embodiments provide that the at least one target cell is a plurality of target cells, and the node is further caused to determine a plurality of SSB RS based CHO execution conditions, each of the plurality of SSB RS based CHO execution conditions associated with a respective target cell of the plurality of target cells, determine a plurality of CSI-RS based CHO execution conditions, each of the CSI-RS based CHO execution conditions associated with a respective target cell of the plurality of target cells, and transmit the RRC reconfiguration information to the at least one UE device, the RRC reconfiguration information including the plurality of SSB RS based CHO execution conditions and the plurality of CSI-RS based CHO execution conditions.

At least one example embodiment may be related to a method of operating a user equipment (UE) device.

In at least one example embodiment, the method may include receiving radio resource control (RRC) reconfiguration information from a source radio access network (RAN) node, the RRC reconfiguration information including a synchronization signal block (SSB) reference signal (RS) based conditional handover (CHO) execution condition associated with at least one target cell, and a channel state information reference signal (CSI-RS) based CHO execution condition associated with the at least one target cell, performing signal measurements of at least one SSB RS and at least one CSI-RS associated with the at least one target cell, the at least one CSI-RS associated with a contention-free random access resource, and performing the CHO with the at least one target cell based on the signal measurement results of the at least one SSB RS, the at least one CSI-RS, the SSB CHO based execution condition, and the CSI-RS based CHO execution condition.

Some example embodiments provide that the method may further include determining whether the signal measurement results of the at least one CSI-RS satisfies the CSI-RS based CHO execution condition, measuring signal received power or signal quality of the at least one CSI-RS of the at least one target cell in response to results of the determining indicating that the CSI-RS based CHO execution condition is satisfied, and determining whether the measured signal received power or signal quality of the at least one CSI-RS satisfies a CSI-RS based random access condition.

Some example embodiments provide that the determining whether the signal measurement results of the CSI-RS CHO execution condition is satisfied further includes determining whether the signal measurement results of the at least one CSI-RS satisfies the CSI-RS CHO execution condition before the signal measurement results of the at least one SSB RS satisfies the SSB CHO based execution condition.

Some example embodiments provide that the CSI-RS based random access condition is at least one of a desired signal received power threshold value or a desired signal quality threshold value.

Some example embodiments provide that the performing the CHO further includes performing random access of the at least one target cell using the at least one CSI-RS in response to results of the determining indicating the measured signal received power or signal quality of the at least one one CSI-RS satisfies the CSI-RS based random access condition.

Some example embodiments provide that, in response to the results of the determination indicating the measured signal received power or signal quality of the at least one CSI-RS do not satisfy the CSI-RS based random access condition, the method further includes determining whether the signal measurement results of the at least one SSB RS satisfies the SSB based CHO execution condition, and performing the CHO by random access of the at least one target cell using at least one SSB corresponding to the at least one target cell in response to results of the determining indicating the SSB based CHO execution condition is satisfied.

Some example embodiments provide that the method may further include determining whether the signal measurement results of the at least one SSB RS satisfies the SSB based CHO execution condition before the signal measurement results of the at least one CSI-RS satisfies the CSI-RS based CHO execution condition, identifying at least one SSB RS which corresponds to a subset of the SSB RS measurements for the target cell when the SSB based CHO execution condition is met, and determining whether the identified at least one SSB RS satisfies a SSB RS based random access condition.

Some example embodiments provide that the SSB RS based random access condition is the at least one SSB RS not being associated with a configured CSI-RS, or a signal received power or signal quality value of the CSI-RS associated with the at least one SSB RS is less than a desired threshold value.

At least one example embodiment may be related to a user equipment (UE) device.

In at least one example embodiment, the UE device may include means for storing computer readable instructions, receiving radio resource control (RRC) reconfiguration information from a source radio access network (RAN) node, the RRC reconfiguration information including a synchronization signal block (SSB) reference signal (RS) based conditional handover (CHO) execution condition associated with at least one target cell controlled by a target RAN node, and a channel state information reference signal (CSI-RS) based CHO execution condition associated with the at least one target cell, performing signal measurements of at least one SSB RS and at least one CSI-RS associated with the at least one target cell, the at least one CSI-RS associated with a contention-free random access resource, and performing the CHO with the at least one target cell based on the signal measurement results of the at least one SSB RS, the at least one CSI-RS, the SSB based CHO execution condition, and the CSI-RS based CHO execution condition.

Some example embodiments provide that the device further includes means for determining whether the signal measurement results of the at least one CSI-RS satisfies the CSI-RS CHO execution condition, measuring signal received power or signal quality of the at least one CSI-RS of the at least one target cell in response to results of the determination indicating that the CSI-RS based CHO execution condition is satisfied, and determining whether the measured signal received power or signal quality of the at least one CSI-RS satisfies a CSI-RS based random access condition.

Some example embodiments provide that the device further includes means for determining whether the signal measurement results of the at least one CSI-RS satisfies the CSI-RS CHO execution condition before the signal measurement results of the at least one SSB RS satisfies the SSB CHO based execution condition.

Some example embodiments provide that the CSI-RS based random access condition is at least one of a desired signal received power threshold value or a desired signal quality threshold value.

Some example embodiments provide that the device means for performing random access of the at least one target cell using the at least one CSI-RS in response to results of the determination indicating the measured signal received power or signal quality of the at least one CSI-RS satisfies the CSI-RS random access condition.

Some example embodiments provide that the device further includes means for determining whether the signal measurement results of the at least one SSB RS satisfies the SSB based CHO execution condition, and performing the CHO by performing random access of the at least one target cell using at least one SSB corresponding to the at least one target cell in response to results of the determination indicating the SSB based CHO execution condition is satisfied, in response to the results of the determination indicating the measured signal received power or signal quality of the at least one CSI-RS do not satisfy the CSI-RS based random access condition.

Some example embodiments provide that the device further includes means for determining whether the signal measurement results of the at least one SSB RS satisfies the SSB based CHO execution condition before the signal measurement results of the at least one CSI-RS satisfies the CSI-RS based CHO execution condition, identifying at least one SSB RS which corresponds to a subset of the SSB RS measurements for the target cell when the SSB based CHO execution condition is met, and determining whether the identified at least one SSB RS satisfies a SSB RS based random access condition.

Some example embodiments provide that the SSB RS based random access condition is the at least one SSB RS not being associated with a configured CSI-RS, or a signal received power or signal quality value of the CSI-RS associated with the at least one SSB RS is less than a desired threshold value.

Some example embodiments provide that the device further includes means for performing random access of the at least one target cell in response to results of the determination indicating the at least one SSB RS satisfies the SSB RS based random access condition.

Some example embodiments provide that the device further includes means for determining whether the signal measurements of the at least one CSI-RS satisfies the CSI-RS based CHO execution condition, and performing the CHO by performing random access of the at least one target cell in response to results of the determination indicating that the CSI-RS based CHO execution condition is satisfied, in response to the results of the determination indicating none of the identified SSB RS satisfies the SSB RS based random access condition.

At least one example embodiment may be related to a radio access network (RAN) node.

In at least one example embodiment, the RAN node may include means for storing computer readable instructions, receiving a measurement report from at least one user equipment (UE) device, transmitting conditional handover (CHO) information to at least one target RAN node, and transmitting radio resource control (RRC) reconfiguration information to the at least one UE device, the RRC reconfiguration information including a synchronization signal block (SSB) reference signal (RS) based CHO execution condition associated with at least one target cell that is controlled by the at least one target RAN node, and a channel state information reference signal (CSI-RS) based CHO execution condition associated with the at least one target cell.

Some example embodiments provide that the at least one target cell is a plurality of target cells, and the node further includes means for determining a plurality of SSB RS based CHO execution conditions, each of the plurality of SSB RS based CHO execution conditions associated with a respective target cell of the plurality of target cells, determining a plurality of CSI-RS based CHO execution conditions, each of the CSI-RS based CHO execution conditions associated with a respective target cell of the plurality of target cells, and transmitting the RRC reconfiguration information to the at least one UE device, the RRC reconfiguration information including the plurality of SSB RS based CHO execution conditions and the plurality of CSI-RS based CHO execution conditions.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
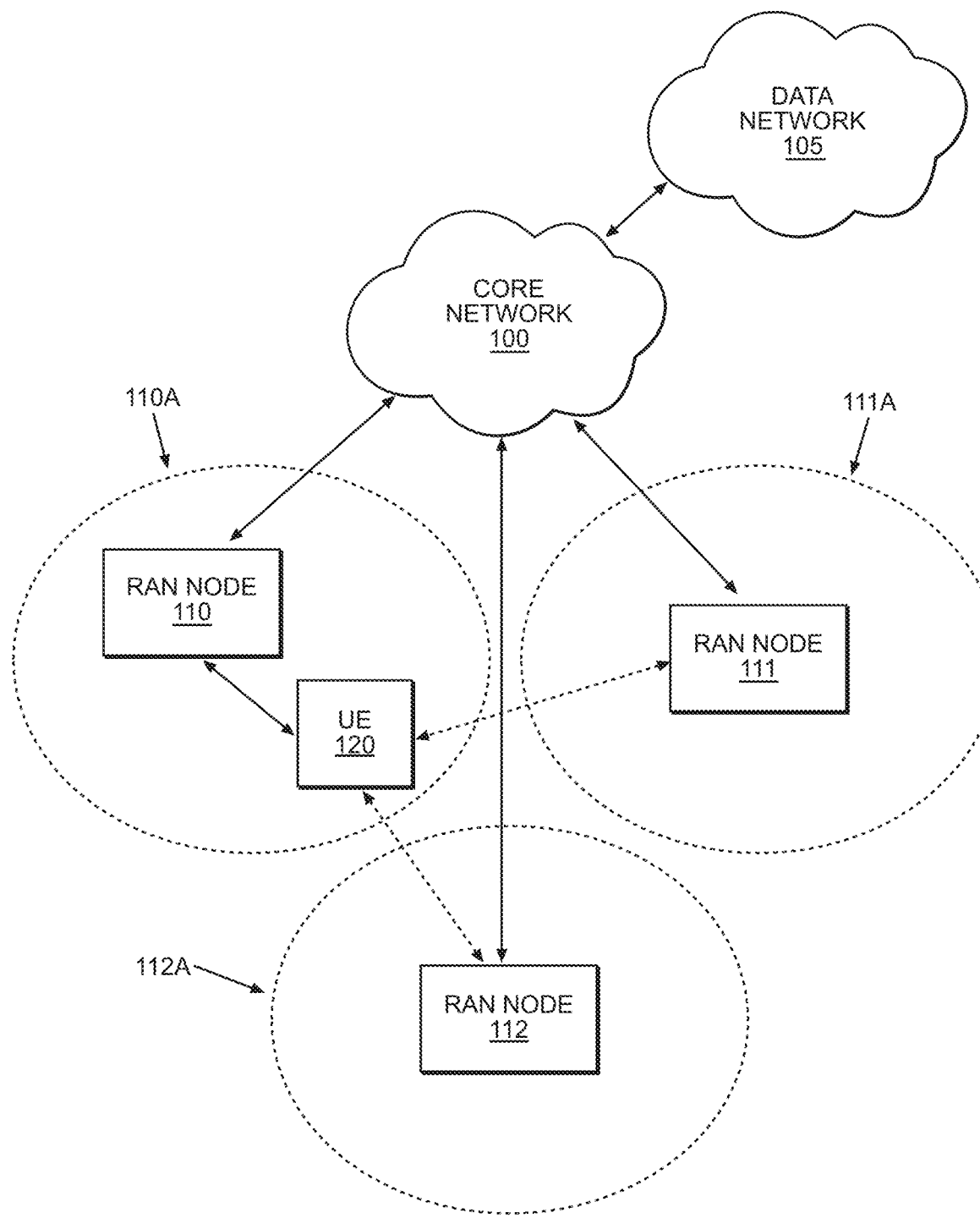
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc.

Various example embodiments are directed towards enhancements to conditional handover (CHO) methods used by UE devices to improve the mobility robustness of UE devices by decreasing and/or minimizing radio link and/or handover failures, etc. According to at least one example embodiment, handover operations for UE devices connected to a wireless network may be improved by providing CHO which decouples the handover preparation stage between the source RAN node and one or more target RAN nodes of the handover operation from the handover execution stage between the UE device and the target RAN node, thereby allowing the source RAN node to send to the UE device handover commands for the target RAN nodes while the UE device is safely connected to the source RAN node (e.g., safely within the boundaries of the cell coverage of the source RAN node), and allowing the UE device to initiate the handover operation to a cell of the one or more target RAN nodes once a CHO execution condition is met. The CHO execution condition is configured by the source cell (e.g., controlled, set, and/or determined by the source RAN node) for each cell of the one or more target RAN nodes. The UE evaluates the CHO execution conditions based on signal measurements collected between the UE device and the cells of the one or more target RAN nodes and/or the signal of the source cell, etc. In CHO, the handover commands are sent before the UE device is at risk of experiencing a RLF and/or connection disruption, etc., thereby decreasing the risk of a RLF, etc., and the UE performs random access to the target cell only when its radio link is sufficient (e.g., is within a desired strength and/or quality threshold ranges, etc.). Thus, the CHO methods of one or more of the example embodiments improve the mobility robustness of the wireless connection. Additionally, according to at least one example embodiment, in CHO the UE device may perform conditional handovers based on contention free random access (CFRA) using channel state information reference signal (CSI-RS) to the target cell or contention based random access (CBRA) and/or CFRA using SSB RS to the target cell. The CFRA resources may be configured by the target cell of handover, but are not limited thereto.

FIG. 1 illustrates a wireless communication system according to at least one example embodiment. As shown in FIG. 1, a wireless communication system includes a core network 100, and a Data Network 105, a first radio access network (RAN) node 110, a second RAN node 111, and a third RAN node 112, a first user equipment device (e.g., UE device or UEs, etc.) 120, but the example embodiments are not limited thereto and the example embodiments may include a greater or lesser number of constituent elements. For example, the wireless communication system may include two or more UE devices, one or two RAN nodes, four or more RAN nodes, additional base stations, routers, access points, gateways, etc.

The RAN node 110, RAN node 111, RAN node 112, and/or the UE device 120 may be connected over a wireless network, such as a cellular wireless access network (e.g., a 3G wireless access network, a 4G-Long Term Evolution (LTE) network, a 5G-New Radio (e.g., 5G) wireless network, a 6G network, a WiFi network, etc.). The wireless network may include a core network 100 and/or a Data Network 105. The RAN node 110, RAN node 111, and/or RAN node 112 may connect to each other and/or other RAN nodes (not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

According to some example embodiments, the RAN nodes 110, 111, and/or 112, etc., may act as a relay node (e.g., an integrated access and backhaul (IAB) node) and may communicate with the UE device 120 in combination with at least one base station (and/or access point (AP), router, etc.) (not shown) of the same or a different radio access technology (e.g., WiFi, etc.).

The UE device 120 may be any one of, but not limited to, a mobile device, a smartphone, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer and/or any other type of stationary or portable device capable of operating according to, for example, the 5G NR communication standard, and/or other wireless communication standard(s). The UE device 120 may be configurable to transmit and/or receive data in accordance to strict latency, reliability, and/or accuracy requirements, such as URLLC communications, TSC communications, etc., but the example embodiments are not limited thereto.

The wireless communication system further includes at least one RAN node (e.g., a base station, a wireless access point, etc.), such as RAN node 110, 111, 112, etc. The RAN nodes 110, 111, and/or 112, etc., may operate according to an underlying cellular and/or wireless radio access technology (RAT), such as 5G NR, LTE, Wi-Fi, etc. For example, the RAN nodes 110, 111, and/or 112, etc., may be a 5G gNB node, a LTE eNB node, or a LTE ng-eNB node, etc., but the example embodiments are not limited thereto. The RAN nodes 110, 111, and/or 112, etc., may provide wireless network services to one or more UE devices within one or more cells (e.g., cell service areas, broadcast areas, serving areas, coverage areas, etc.) surrounding the respective physical location of the RAN node, such as a cell 110A surrounding the RAN node 110, a cell 111A surrounding the RAN node 111, a cell 112A surrounding the RAN node 112, etc.

For example, UE device 120 is located within the cell service area 110A, and may connect to, receive broadcast messages from, receive paging messages from, receive/transmit signaling messages from/to, and/or access the wireless network through, etc., RAN node 110 (e.g., the source RAN node serving the UE device, etc.), but the example embodiments are not limited thereto. However, the UE device 120 may move to a location and/or otherwise experience a stronger and/or higher quality signal from one or more cells of other RAN nodes, such as RAN nodes 111 and/or 112, etc. Accordingly, the RAN nodes 111 and/or 112, etc., may be considered target RAN nodes, and respectively, the cell service areas 111A and/or 112A may be considered target cells for performing a handover operation of the UE device 120.

While FIG. 1 illustrates a single cell for each of the RAN nodes 110, 111, and 112, the example embodiments are not limited thereto, and for example, one or more of the RAN nodes may provide a plurality of cells, etc.

Additionally, the RAN nodes 110, 111, and/or 112, etc., may be configured to operate in a multi-user (MU) multiple input multiple out (MIMO) mode and/or a massive MIMO (mMIMO) mode, wherein the RAN node 110 transmits a plurality of beams (e.g., radio channels, datastreams, streams, etc.) in different spatial domains and/or frequency domains using a plurality of antennas (e.g., antenna panels, antenna elements, an antenna array, etc.) and beamforming and/or beamsteering techniques.

The RAN nodes 110, 111, and/or 112, etc., may be connected to at least one core network element (not shown) residing on the core network 100, such as a core network device, a core network server, access points, switches, routers, nodes, etc., but the example embodiments are not limited thereto. The core network 100 may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., and/or equivalent functions, but the example embodiments are not limited thereto.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system, such as access points, switches, routers, nodes, servers, gateways, etc.

Figure 2:
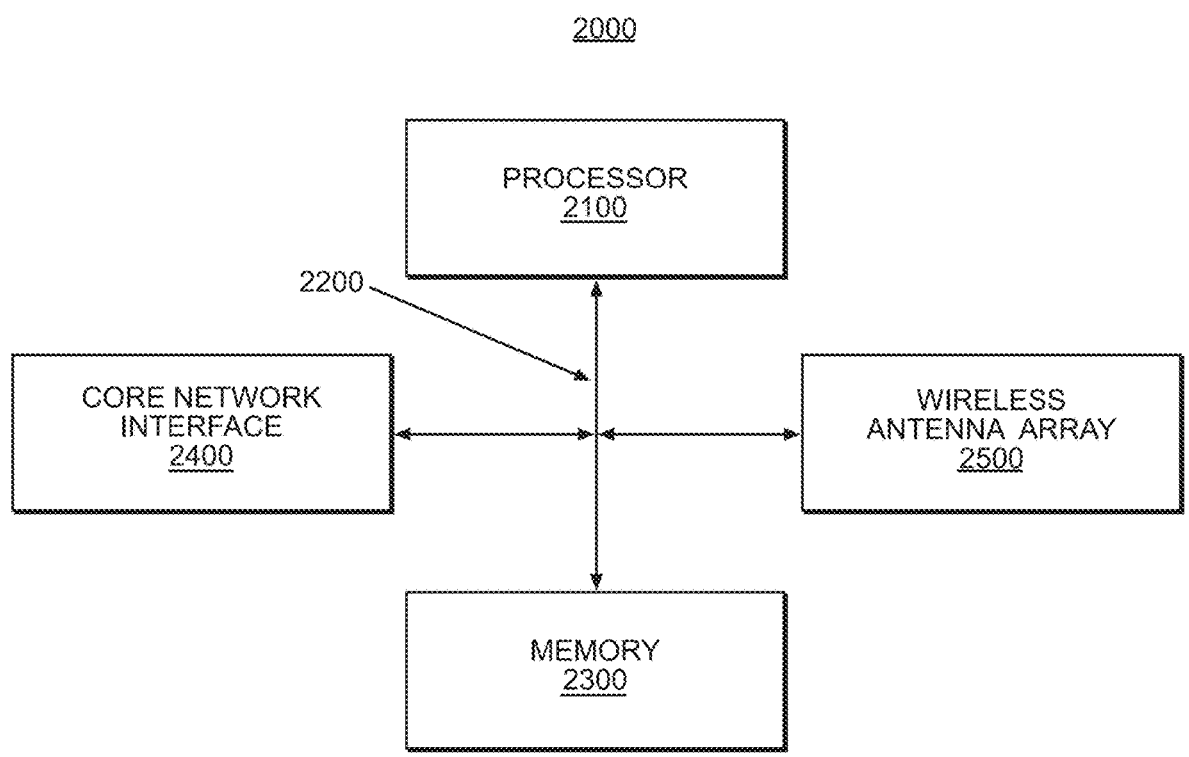
FIG. 2 illustrates a block diagram of an example RAN node according to at least one example embodiment.

FIG. 2 illustrates a block diagram of an example RAN node according to at least one example embodiment. The RAN node of FIG. 2 may correspond to one or more of the RAN nodes 110, 111, and/or 112 of FIG. 1, but the example embodiments are not limited thereto.

Referring to FIG. 2, a RAN node 2000 may include processing circuitry, such as at least one processor 2100, at least one communication bus 2200, a memory 2300, at least one core network interface 2400, and/or at least one wireless antenna array 2500, etc., but the example embodiments are not limited thereto. For example, the core network interface 2400 and the wireless antenna array 2500 may be combined into a single network interface, etc., or the RAN node 2000 may include a plurality of wireless antenna arrays, a plurality of core network interfaces, etc., and/or any combinations thereof. The memory 2300 may include various special purpose program code including computer executable instructions which may cause the RAN node 2000 to perform the one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the RAN node 2000, and thereby cause the RAN node 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire RAN node 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the RAN node 2000, such as the methods discussed in connection with FIGS. 4A to 6, the at least one core network interface 2400, and/or at least one wireless antenna array 2500, etc. Such software elements may be loaded from a non-transitory computer-readable storage medium independent of the memory 2300, using a drive mechanism (not shown) connected to the RAN node 2000, or via the at least one core network interface 2400, and/or at least one wireless antenna array 2500, etc.

In at least one example embodiment, the communication bus 2200 may enable communication and data transmission to be performed between elements of the RAN node 2000. The bus 2200 may be implemented using a high-speed serial bus, a parallel bus, and/or any other appropriate communication technology. According to at least one example embodiment, the RAN node 2000 may include a plurality of communication buses (not shown), such as an address bus, a data bus, etc.

The RAN node 2000 may operate as, for example, a 4G RAN node, a 5G RAN node, etc., and may be configured to schedule time domain resource allocations (TDRAs), e.g., orthogonal frequency division multiplexing (OFDM) symbols, physical resource blocks (PRBs), resource elements, etc., for UE devices connected to the RAN node 2000, but the example embodiments are not limited thereto.

For example, the RAN node 2000 may allocate time-frequency resources of a carrier (e.g., resource blocks with time and frequency dimensions) based on operation on the time domain (e.g., time division duplexing) and/or the frequency domain (e.g., frequency division duplexing). In the time domain context, the RAN node 2000 will allocate a carrier (or subbands of the carrier) to one or more UEs (e.g., UE 120, etc.) connected to the RAN node 2000 during designated upload (e.g., uplink (UL)) time periods and designated download (e.g., downlink (DL)) time periods, or during designated special (S) time periods which may be used for UL and/or DL, but the example embodiments are not limited thereto.

When there are multiple UEs connected to the RAN node 2000, the carrier is shared in time such that each UE is scheduled by the RAN node 2000, and the RAN node 2000 allocates each UE with their own uplink time and/or downlink time. In the frequency domain context and/or when performing spatial domain multiplexing of UEs (e.g., MU MIMO, etc.), the RAN node 2000 will allocate separate frequency subbands of the carrier to UEs simultaneously served by the RAN node 2000, for uplink and/or downlink transmissions. Data transmission between the UE and the RAN node 2000 may occur on a radio frame basis in both the time domain and frequency domain contexts. The minimum resource unit for allocation and/or assignment by the RAN node 2000 to a particular UE device corresponds to a specific downlink/uplink time interval (e.g., one OFDM symbol, one slot, one minislot, one subframe, etc.) and/or a specific downlink/uplink resource block (e.g., twelve adjacent subcarriers, a frequency subband, etc.).

For the sake of clarity and consistency, the example embodiments will be described as using the time domain, but the example embodiments are not limited thereto.

Additionally, the RAN node 2000 may transmit scheduling information via physical downlink common channel (PDCCH) information to the one or more UE devices located within the cell servicing area of the RAN node 2000, which may configure the one or more UE devices to transmit (e.g., UL transmissions via physical uplink control channel (PUCCH) information and/or physical uplink shared channel information (PUSCH), etc.) and/or receive (e.g., DL transmissions via PDCCH and/or physical downlink shared channel information (PDSCH), etc.) data packets to and/or from the RAN node 2000. Additionally, the RAN node 2000 may transmit control messages to the UE device using downlink control information (DCI) messages via physical (PHY) layer signaling, medium access control (MAC) layer control element (CE) signaling, radio resource control (RRC) signaling, etc., but the example embodiments are not limited thereto.

The RAN node 2000 may also include at least one core network interface 2400, and/or at least one wireless antenna array 2500, etc. The at least one wireless antenna array 2500 may include an associated array of radio units (not shown) and may be used to transmit the wireless signals in accordance with a radio access technology, such as 4G LTE wireless signals, 5G NR wireless signals, etc., to at least one UE device, such as UE 120, etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, and/or with different delays, etc., but the example embodiments are not limited thereto.

The RAN node 2000 may communicate with a core network (e.g., backend network, backhaul network, backbone network, Data Network, etc.) of the wireless communication network via a core network interface 2400. The core network interface 2400 may be a wired and/or wireless network interface and may enable the RAN node 2000 to communicate and/or transmit data to and from to network devices on the backend network, such as a core network gateway (not shown), a Data Network (e.g., Data Network 105), such as the Internet, intranets, wide area networks, telephone networks, VoIP networks, etc.

While FIG. 2 depicts an example embodiment of a RAN node 2000, the RAN node is not limited thereto, and may include additional and/or alternative architectures that may be suitable for the purposes demonstrated. For example, the functionality of the RAN node 2000 may be divided among a plurality of physical, logical, and/or virtual network elements, such as a centralized unit (CU), a distributed unit (DU), a remote radio head (RRH), and/or a remote radio unit (RRU), etc. Additionally, the RAN node 2000 may operate in standalone (SA) mode and/or non-standalone (NSA) mode using interfaces (not shown) such as X2, Xn, etc., between the RAN node 2000 and other RAN nodes of the wireless network, interfaces, such as S1, NG, etc., between the RAN node 2000 and the core network (e.g., core network 100), interfaces between network functions of the RAN node 2000 operating in a distributed and/or virtual RAN mode (not shown), such as F1, E1, etc., and/or interfaces between the physical layer (e.g., a baseband unit, etc.) and the radio layer (e.g., a RRH, core network interface 2400, etc.) (not shown), such as CPRI, eCPRI, etc., but the example embodiments are not limited thereto.

Figure 3:
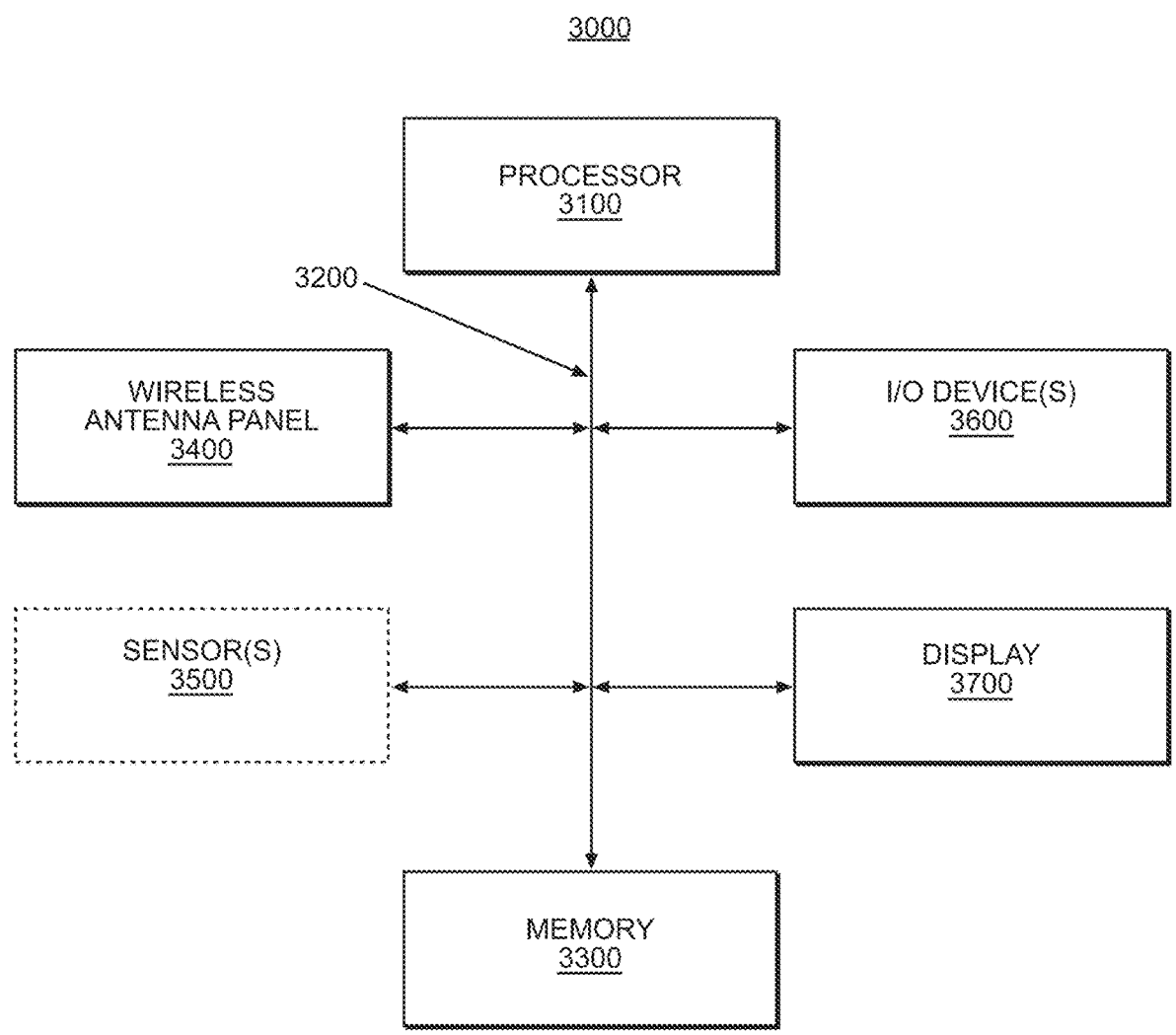
FIG. 3 illustrates a block diagram of an example UE device according to at least one example embodiment.

FIG. 3 illustrates a block diagram of an example UE device according to at least one example embodiment. The example UE device 3000 of FIG. 3 may correspond to the UE device 120 of FIG. 1, but the example embodiments are not limited thereto.

Referring to FIG. 3, a UE 3000 may include processing circuitry, such as at least one processor 3100, at least one communication bus 3200, a memory 3300, a plurality of wireless antennas and/or wireless antenna panels 3400, at least one input/output (I/O) device 3600 (e.g., a keyboard, a touchscreen, a mouse, a microphone, a camera, a speaker, etc.), and/or a display panel 3700 (e.g., a monitor, a touchscreen, etc.), but the example embodiments are not limited thereto. According to some example embodiments, the UE 3000 may include a greater or lesser number of constituent components, and for example, the UE 3000 may also include at least one sensor 3500, such as one or more proximity sensors (e.g., an infra-red proximity sensor, a capacitive proximity sensor, etc.), one or more location sensors (e.g., GPS, GLONASS, Beidou, Galileo, etc.), other sensors (e.g., thermometers, humidity sensors, pressure sensors, motion sensors, accelerometers, etc.), a battery, actuators, a single wireless antenna and/or a single wireless antenna panel, etc. Additionally, the display panel 3700, and/or I/O device 3600, etc., of UE 3000 may be optional.

In at least one example embodiment, the processing circuitry may include at least one processor (and/or processor cores, distributed processors, networked processors, etc.), such as the at least one processor 3100, which may be configured to control one or more elements of the UE 3000, and thereby cause the UE 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire UE 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the UE 3000, such as the methods discussed in connection with FIGS. 4A to 6, etc. Such software elements may be loaded from a non-transitory computer-readable storage medium independent of the memory 3300, using a drive mechanism (not shown) connected to the UE 3000, or via the wireless antenna 3400, etc. Additionally, the memory 3300 may store network configuration information, such as system information, resource block scheduling, CHO conditions, etc., for communicating with at least one RAN node, e.g., RAN node 110, etc., accessing a wireless network, etc., but the example embodiments are not limited thereto.

In at least one example embodiment, the at least one communication bus 3200 may enable communication and data transmission/reception to be performed between elements of the UE 3000. The bus 3200 may be implemented using a high-speed serial bus, a parallel bus, and/or any other appropriate communication technology. According to at least one example embodiment, the UE 3000 may include a plurality of communication buses (not shown), such as an address bus, a data bus, etc.

The UE 3000 may also include at least one wireless antenna panel 3400, but is not limited thereto. The at least one wireless antenna panel 3400 may include at least one associated radio unit (not shown) and may be used to transmit wireless signals in accordance with at least one desired radio access technology, such as 4G LTE, 5G NR, Wi-Fi, etc. The at least one wireless antenna panel 3400 may be located at the same or different physical locations on the body of the UE 3000, may have the same or different orientations, may operate in the same or different frequency ranges, may operate in accordance with the same or different radio access technology, etc. According to some example embodiments, the at least one wireless antenna panel 3400 may be a single antenna, or may be a plurality of antennas, etc.

According to some example embodiments, the UE 3000 may measure one or more radio signal power and/or signal quality metrics using the at least one wireless antenna panel 3400 corresponding to SSB and/or CSI-RS signals transmitted by one or more RAN nodes, such as a source RAN node (e.g., RAN node 110) and/or one or more target RAN nodes (e.g., RAN nodes 111 and/or 112, etc.), but the example embodiments are not limited thereto. More specifically, the UE 3000 may measure radio signal power and/or cell quality metrics such as reference signal received power (RSRP) (e.g., SS-RSRP and/or CSI-RSRP, etc.), reference signal received quality (RSRQ) (e.g., SS-RSRQ and/or CSI-RSRQ, etc.), received signal strength indicator (RSSI) (e.g., NR-RSSI, CSI-RSSI, etc.), signal to interference and noise ratio (SINR) (e.g., SS-SINR, CSI-SINR), etc., but the example embodiments are not limited thereto.

While FIG. 3 depicts an example embodiment of a UE 3000, the UE device is not limited thereto, and may include additional and/or alternative architectures that may be suitable for the purposes demonstrated.

Figure 4A:
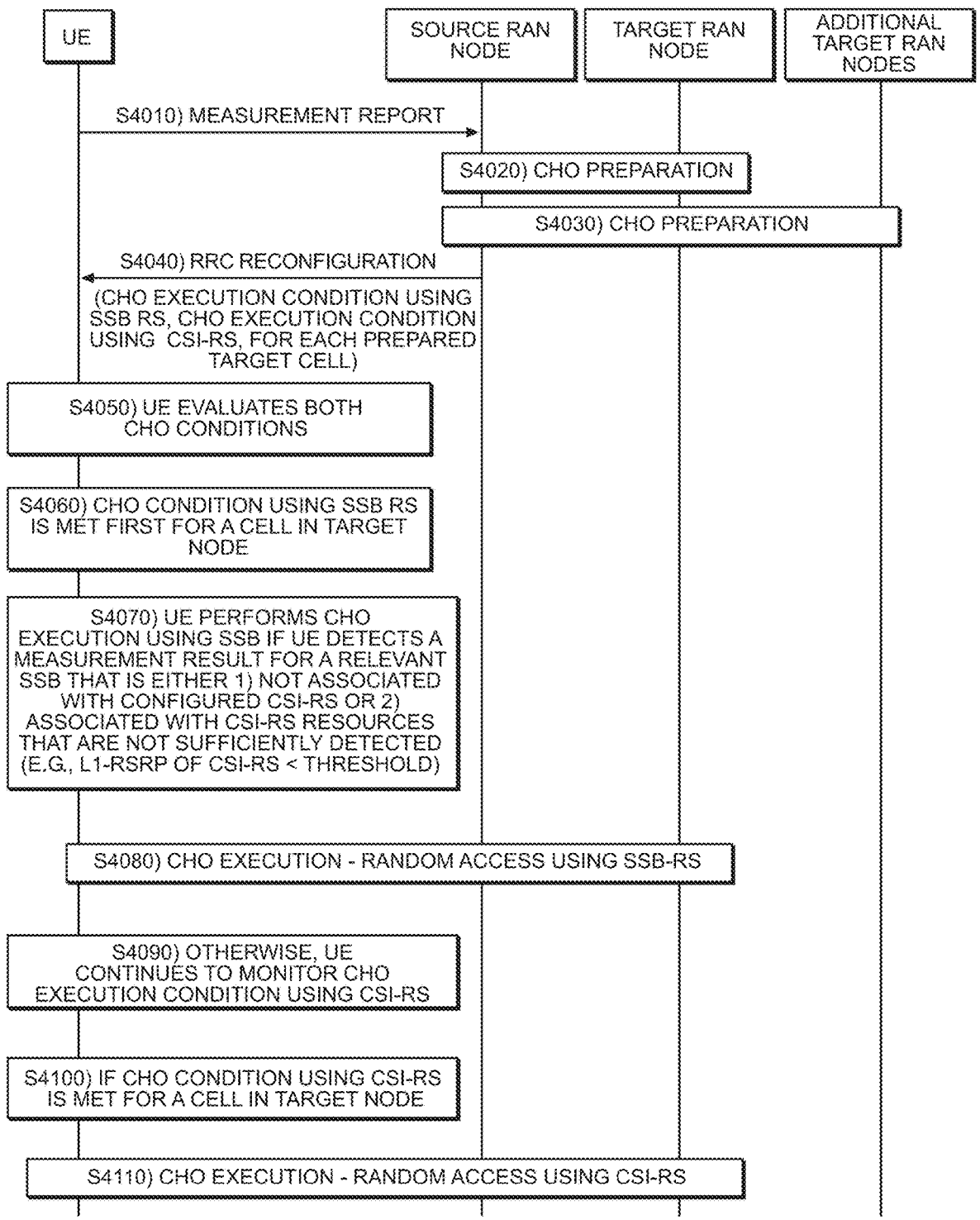
FIGS. 4A and 4B illustrate an example transmission flow diagram and an example flowchart depicting a first method of performing fallback to a conditional handover operation using SSB reference signals according to some example embodiments.
Figure 4B:
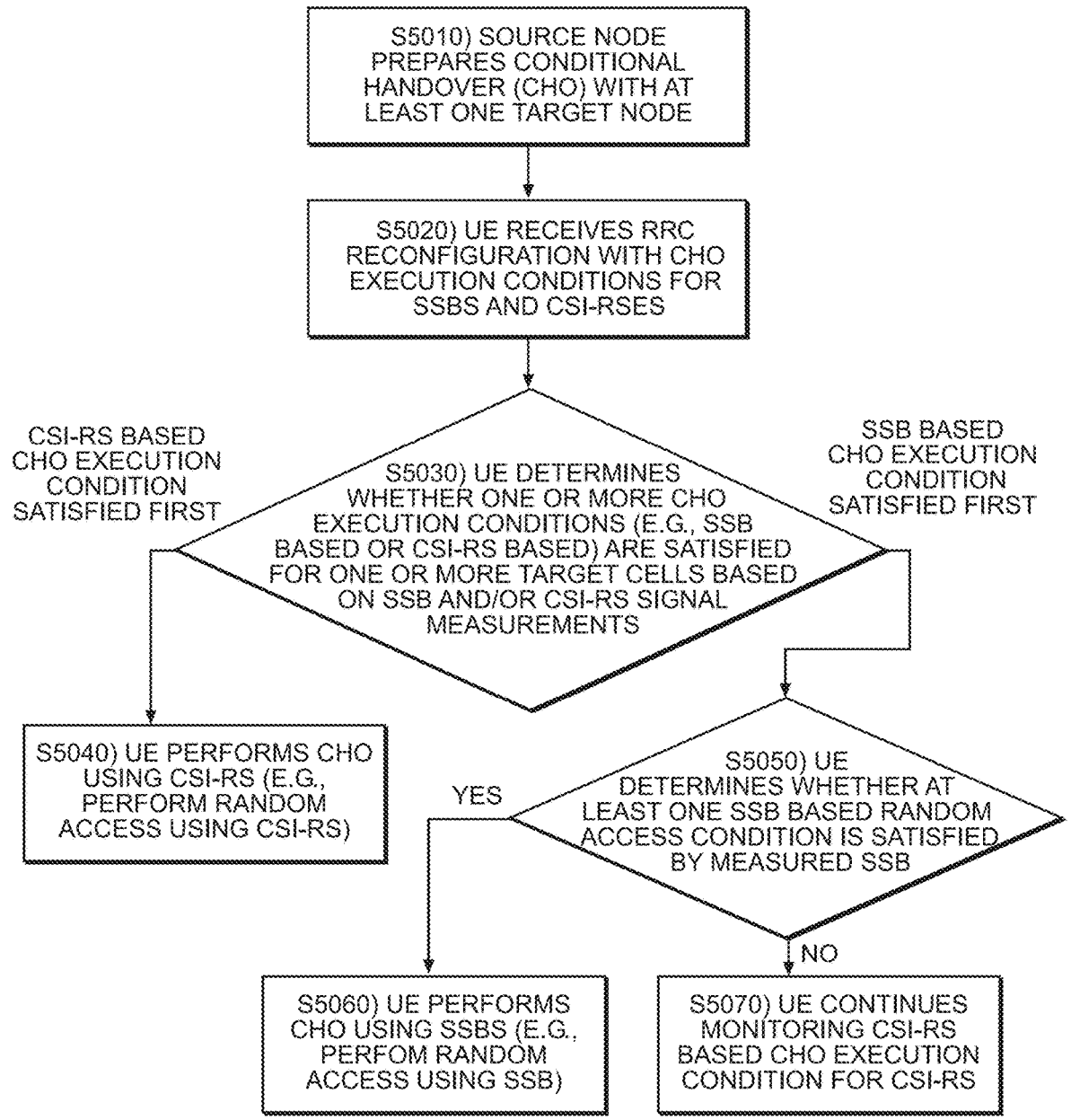

FIGS. 4A and 4B illustrate an example transmission flow diagram and an example flowchart depicting a first method of performing fallback to a conditional handover operation using SSB reference signals according to some example embodiments.

Referring now to FIG. 4A and FIG. 4B, FIG. 4A is a first example transmission flow diagram between at least one UE device, a source RAN node, and one or more target RAN nodes performing an example CHO operation according to at least one example embodiment, and FIG. 4B is a flowchart corresponding to the FIG. 4A. According to at least one example embodiment, in operation S4010, a UE device, such as UE device 120, etc., of FIG. 1, may transmit a signal quality and/or cell quality measurement report to a source RAN node, such as RAN node 110 of FIG. 1, regarding the signal quality and/or cell quality measurement report of the active cell connection between the UE device and the source RAN node. According to at least one example embodiment, the measurement report may include one or more radio signal power and/or cell quality metrics, such as RSRP, RSRQ, RSSI, SINR, etc., but the example embodiments are not limited thereto. Additionally, according to at least one example embodiment, the UE device may transmit the measurement report periodically and/or in response to changes in the received signal power and/or signal quality values based on internally stored rules and/or network configuration settings, etc., but the example embodiments are not limited thereto.

In response to the at least one value of the received measurement report not satisfying at least one desired handover condition, in operations S4020 and S4030 of FIG. 4A and S5010 of FIG. 4B, the source RAN node may initiate CHO preparation with at least one target RAN node, such as the RAN node 111 and RAN node 112 of FIG. 1, but the example embodiments are not limited thereto. The CHO preparation may include the transmission of CHO request messages including the UE context (such as on-going PDU session information, DRB and QoS flow information, etc., related to the UE, etc.) to the at least one target RAN node by the source RAN node, the reservation of network resources, e.g., reservation of CFRA resources associated with CSI-RS and/or SSB, for the UE device, etc., by the at least one target RAN node, as well as the transmission of CHO request acknowledgement messages containing the target cell configuration for handover (such as a handover command to be forwarded by the source RAN node to the UE, etc.) from the at least one target RAN node to the source RAN node, etc.

In operation S4040 and S5020, in response to receiving the CHO request acknowledgement message(s) indicating that the at least one target RAN node is ready to perform a network handover operation of the identified UE device, the source RAN node may transmit a RRC reconfiguration to the UE device. The RRC reconfiguration may include at least one SSB RS-related CHO execution condition and at least one CSI-RS-related CHO execution condition. According to at least one example embodiment, in operations S4050 and S5030, the UE device may measure and evaluate the SSB RS and/or the CSI-RS corresponding to one or more cells of the at least one target RAN node for use in the handover operation, thereby allowing the UE device to use either the SSB RS(es) or the CSI-RS(es) to connect to the target RAN node and improving the reliability and/or redundancy of handover operations using the example embodiments. Additionally, by providing CHO execution conditions for both the SSB RS and the CSI-RS, the UE device is capable of performing contention free random access (CFRA) using the CSI-RS of a target cell or falling back to random access (either contention free or contention based) using the SSB of the target cell (or a different target cell) based on current network conditions of the target cell(s) thereby potentially improving the speed and/or efficiency of the handover operation by prioritizing handovers using CSI-RS over handovers using SSB, whenever possible, as well reducing the amount of signaling, reducing the latency, and providing greater link budget when using CFRA with CSI-RS instead of random access with SSB.

According to some example embodiments, the CHO execution conditions may include at least one condition which corresponds to one or more target cells, etc., or in other words, different target cells may have different CHO execution conditions, the same CHO execution conditions, etc. As one example, a CHO execution condition may be an A3 measurement event, e.g., $Mn > Ms + Off$, where $Mn$ is a cell quality measurement taken by the UE device of the target cell, Ms is the cell quality measurement taken by the UE device of the source cell, and Off is a desired offset (e.g., 3 dB, etc.) which may be configured by the source RAN node, the target RAN node, the core network, the UE device, etc. In another example, a CHO execution condition may be an A5 measurement event, e.g., Ms<Thr1 and Mn>Thr2. The measurements Ms and Mn may refer to desired signal power or signal quality measurements, such as RSRP and/or RSRQ measurements, etc., that are performed using CSI-RS and/or SSB of the source cell (e.g., Ms) and/or the target cell(s) (e.g., Mn), etc., and Thr1 may refer to a desired cell quality measurement threshold for the source cell (e.g., the cell quality measurement threshold which when the current cell quality measurement drops below initiates the UE to begin a handover operation from the source cell, etc.), and Thr2 may refer to a desired cell quality measurement threshold for the target cell (e.g., the cell quality measurement threshold which must be exceeded for the UE to choose the target cell as the cell to connect to next, etc.), but the example embodiments are not limited thereto. According to at least one example embodiment, the Ms and/or Mn cell quality measurement may be derived by the UE device by taking an average of the N strongest SSB RS or CSI-RS measurements of the same cell that are above a desired beam strength threshold, where N is equal or greater than 1 and may be configured by the source RAN node, the target RAN node, the core network, may be defined by the wireless protocol standard (e.g., the 5G NR standard, etc.), and/or by defined by a user. If none of the beam measurement is above the desired beam strength threshold and/or there is only a single beam measurement, the UE takes the strongest (e.g., highest) beam measurement as the cell quality measurement for the cell. Moreover, the example embodiments are not limited to the A3 and A5 measurement events discussed above, and other CHO execution conditions may be used.

Referring again to operations S4050 and S5030, the UE device may measure the CSI-RS and SSB-RS signal power and/or signal quality metrics for each of the target cells of the each of the target RAN nodes and determine whether any of the CSI-RS measurement results of the one or more target cells satisfy any of the corresponding CSI-RS CHO execution conditions, and may also determine whether any of the SSB-RS measurement results of the one or more target cells satisfy any of the corresponding SSB-RS CHO execution conditions, but the example embodiments are not limited thereto. In operation S4060 and S5050, in response to the UE device determining that SSB-RS measurement results of a target cell satisfy a SSB RS CHO execution condition before CSI-RS measurement results of a target cell satisfy a CSI-RS CHO execution condition, the UE device will determine whether the measured SSB (and/or relevant SSB) of the target cell satisfies at least one SSB based random access condition. For example, the SSB based random access condition may be at least one of determining whether the measured SSB is a strong SSB that is not associated with a configured CSI-RS (e.g., a CSI-RS which is reserved for the UE by the target RAN node during the CHO preparation operation of S4030, etc.), or is a SSB associated with CSI-RS resources that are not sufficiently detected (e.g., the measured L1-RSRP of the CSI-RS associated with the measured SSB is less than a desired L1-RSRP threshold, etc.), etc., but the example embodiments are not limited thereto.

If the UE device determines that the measured SSB satisfies the at least one SSB based random access condition, in operations S4080 and S5060, the UE performs random access of the target cell using SSB (e.g., performs the conditional handover operation using the measured SSB or using another SSB associated with the same target cell, etc., which may be determined based on network configuration settings, etc.).

In the event that the measured SSB does not satisfy the at least one SSB based random access condition, in operations S4090 and S5070, the UE device continues monitoring the CSI-RSes identified in the RRC reconfiguration to determine whether any of the CSI-RS measurement results satisfy the CSI-RS based CHO execution condition.

Now referring to operations 54100 and S5030, in the event that the UE device determines that the CSI-RS based CHO execution condition is satisfied, the UE device performs random access of the target cell as shown in operation S4110. One benefit provided by the first CHO method shown in FIGS. 4A and 4B is that it avoids RLFs of the UE devices that are caused by misconfiguration of CSI-RS resources of the target cell(s). For example, in a case where the relevant CSI-RS resources of a prepared target cell (e.g., a cell prepared by a target RAN node to connect with the UE in response to the CHO preparation message from the source RAN node, etc.) are not properly configured, the UEs are able to perform a fallback handover using SSB instead rather than suffering from RLFs using the CSI-RS.

Figure 5A:
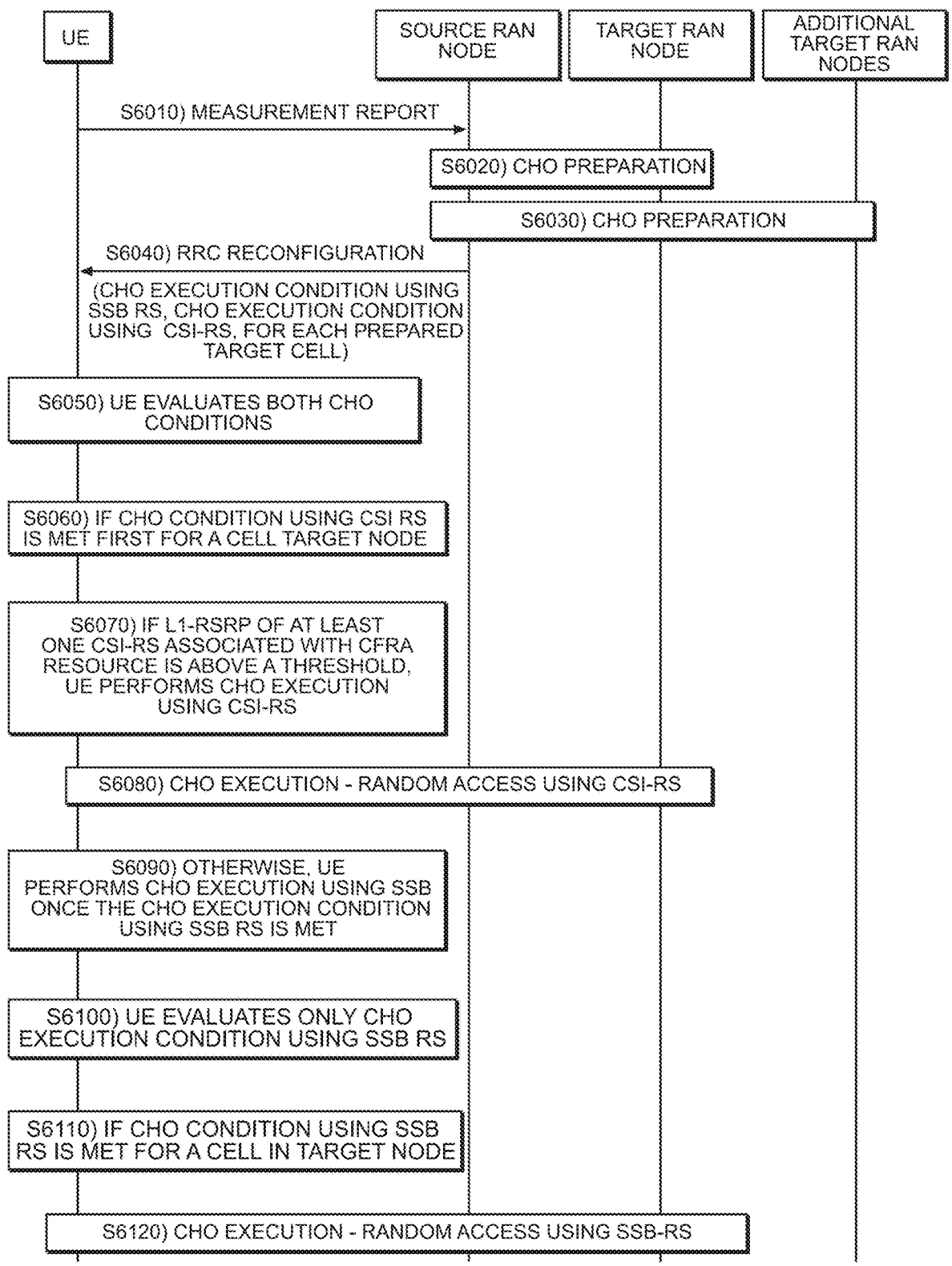
FIGS. 5A and 5B illustrate an example transmission flow diagram and an example flowchart depicting a second method of performing fallback to a conditional handover operation using SSB reference signals according to some example embodiments.
Figure 5B:
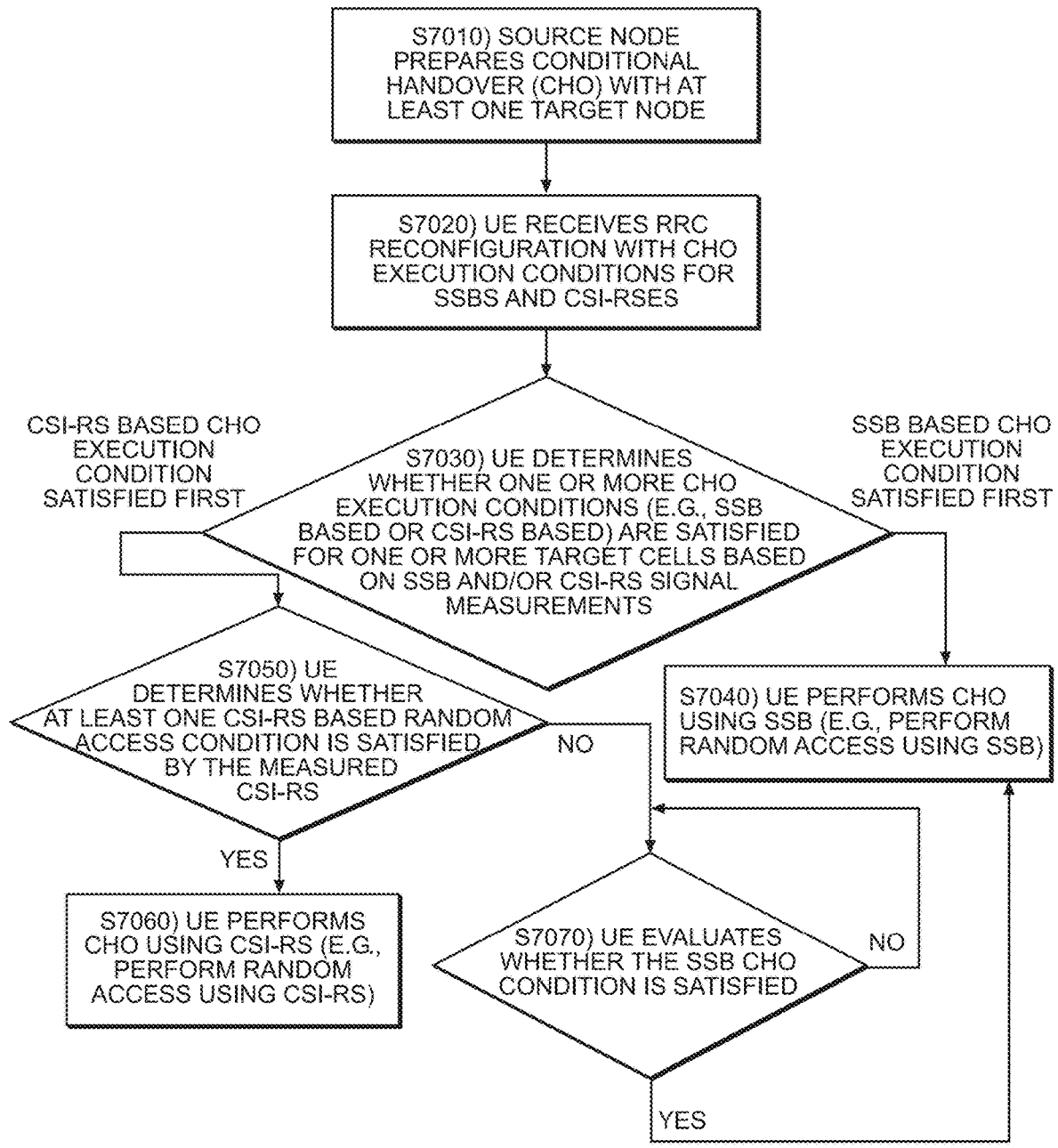

FIGS. 5A and 5B illustrate an example transmission flow diagram and an example flowchart depicting a second method of performing fallback to a conditional handover operation using SSB reference signals according to some example embodiments.

Operations S6010 to S6050 of FIG. 5A and operations S7010 to S7030 of FIG. 5B are similar to operations S4010 to S4050 of FIG. 4A and operations S5010 to S5030 of FIG. 4B, therefore description of these operations will be omitted for the sake of brevity.

In operation S7040, in the event that the UE device determines that at least one SSB measurement of a target cell satisfies the corresponding SSB RS CHO execution condition before CSI-RS measurements of a target cell satisfies the corresponding CSI-RS CHO execution condition, the UE device performs CHO using SSB corresponding to the target cell (e.g., performs random access using the relevant SSB or performs random access using a different SSB of the same target cell, etc.).

However, in operations S6060 and S7050, in response to the UE device determining that CSI-RS measurements of a target cell satisfies the corresponding CSI-RS CHO execution condition before SSB-RS measurements of a target cell satisfies the corresponding SSB CHO execution condition, the UE device determines whether at least one CSI-RS based random access condition is satisfied by the measured and/or relevant CSI-RS of the target cell. For example, the CSI-RS based random access condition may be the L1-RSRP of at least one CSI-RS associated with a CFRA is above a desired RSRP threshold, etc., but the example embodiments are not limited thereto. In the event that the CSI-RS based random access condition is satisfied by the relevant CSI-RS, in operations S6070 and S7060, the UE device may perform random access using the relevant CSI-RS (e.g., perform CHO using the relevant CSI-RS, etc.).

If the CSI-RS based random access condition is not satisfied by the relevant CSI-RS, in operations S6100 and S7070, the UE device evaluates whether the SSB measurement results corresponding to a target cell satisfy a SSB based CHO execution condition. In the event that the SSB based CHO execution condition is satisfied, as shown in operation S6100, the UE device performs CHO (e.g., random access of the target cell) using a SSB corresponding to the target cell (e.g., performs operations S6120 and S7040). One benefit of the second CHO method shown in FIG. 5A and FIG. 5B, is that in a case where CHO execution using CSI-RS is not possible, not available, and/or not desired, the UE may fallback to CHO using SSB (potentially CFRA using the SSB) and perform the handover execution on time when the signal from the target cell is strong enough instead of performing a blind fallback to SSB CBRA as performed using conventional handover techniques, thereby providing more resource efficiency over conventional handover techniques and/or providing improved connections for the UE over conventional handover techniques.

Figure 6:
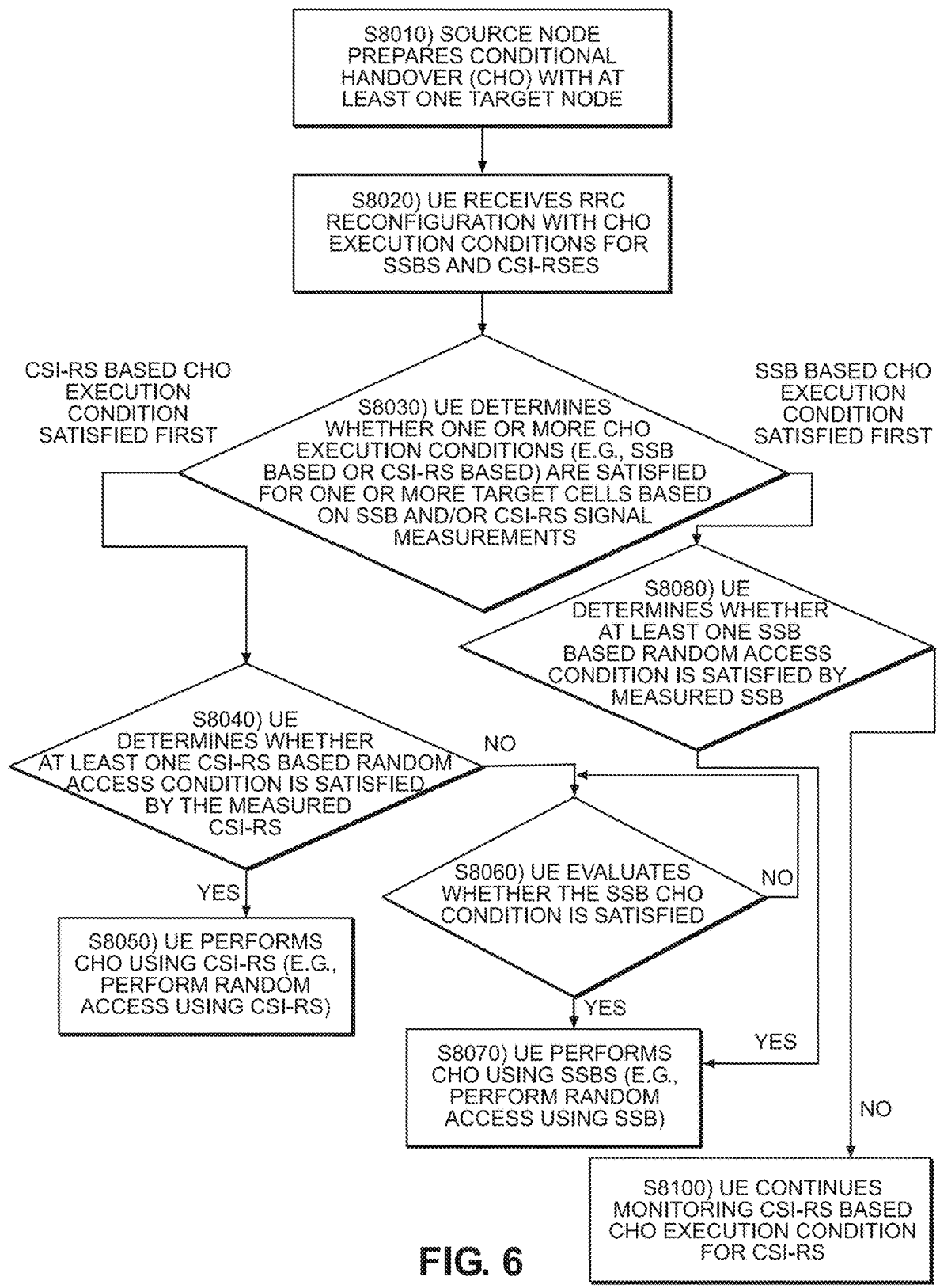
FIG. 6 illustrates an example flowchart depicting a third method of performing fallback to a conditional handover using SSB reference signals according to at least one example embodiment.

FIG. 6 illustrates an example flowchart depicting a third method of performing fallback to a conditional handover using SSB reference signals according to at least one example embodiment. According to at least one example embodiment, the third method of FIG. 6 is a combination of the first and second methods that are illustrated in FIGS. 4B and 5B.

Operations S8010 to S8030 of FIG. 6 are similar to operations S4010 to S4050 of FIG. 4A, operations S5010 to S5030 of FIG. 4B, operations S6010 to S6050 of FIG. 5A and operations S7010 to S7030 of FIG. 5B, therefore description of these operations will be omitted for the sake of brevity.

In response to the UE device determining that at least one CSI-RS based CHO execution condition has been satisfied first, in operation S8040, similar to operation S7050 of FIG. 5B, the UE device may determine whether the relevant CSI-RS satisfies at least one CSI-RS based random access condition. In the event that the CSI-RS based random access condition is satisfied by the measured CSI-RS, in operation S8050 the UE device performs the CHO using the measured CSI-RS, e.g., the UE device performs random access to the target cell using the relevant CSI-RS, similar to operation S7060 of FIG. 5B.

In the event that the CSI-RS based random access condition is not satisfied by the measured CSI-RS, in operation S8060 the UE device evaluates whether the SSB based CHO execution condition has been satisfied by any of the target cells. In the event that the SSB based CHO execution condition has been satisfied, the UE performs CHO using SSB, e.g., the UE performs random access to the target cell using the relevant SSB or a different SSB of the target cell. Otherwise, the UE continues to monitor the SSBs of the target cells to determine whether at least one SSB based CHO execution conditions is satisfied.

In response to the UE determining that the SSB based CHO execution condition was satisfied first in operation S8030, the UE device determines whether at least one SSB based random access condition is satisfied by the relevant SSB in operation S8080, similar to operation S5050 of FIG. 4B. If the UE determines the SSB based random access condition was satisfied by the relevant SSB, the UE performs CHO using SSB (e.g., operation S8070). However, if the UE determines that the SSB based random access condition was not satisfied by the relevant SSB, the UE continues to monitoring the CSI-RSes to determine whether at least one CSI-RS based CHO execution condition is satisfied as shown in operation S8100. According to at least one example embodiment, the third CHO method may combine the advantages of the first CHO method and the second CHO method, e.g., providing fallback handover using SSB in the event that relevant CSI-RS resources of a target cell are not properly configured by the target RAN node, thereby avoiding RLFs, and/or potentially performing fallback CFRA handover using SSB when CHO execution using CSI-RS is not possible, not available, and/or not desired, thereby reducing network resource usage and/or providing improved network connections to the UE.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A user equipment (UE) device comprising:
   a memory storing computer readable instructions; and
   processing circuitry configured to execute the computer readable instructions to cause the device to,
   receive radio resource control (RRC) reconfiguration information from a source radio access network (RAN) node, the RRC reconfiguration information including a synchronization signal block (SSB) reference signal (RS) based conditional handover (CHO) execution condition associated with at least one target cell controlled by a target RAN node, and a channel state information reference signal (CSI-RS) based CHO execution condition associated with the at least one target cell,
   perform signal measurements of at least one SSB RS and at least one CSI-RS associated with the at least one target cell, the at least one CSI-RS associated with a contention-free random access resource, and
   perform the CHO with the at least one target cell based on the signal measurement results of the at least one SSB RS, the at least one CSI-RS, the SSB based CHO execution condition, and the CSI-RS based CHO execution condition, wherein
   in response to the SSB based CHO execution condition first being satisfied and to determining that at least one SSB based random access condition is not satisfied, not performing SSB based CHO execution and continuing to monitor the CSI-RS based execution condition.

2. The device of claim 1, wherein the device is further caused to:
   determine whether the signal measurement results of the at least one CSI-RS satisfies the CSI-RS CHO execution condition;
   measure signal received power or signal quality of the at least one CSI-RS of the at least one target cell in response to results of the determination indicating that the CSI-RS based CHO execution condition is satisfied; and
   determine whether the measured signal received power or signal quality of the at least one CSI-RS satisfies a CSI-RS based random access condition.

3. The device of claim 2, wherein the device is further caused to:
   determine whether the signal measurement results of the CSI-RS CHO execution condition is satisfied further includes determining whether the signal measurement results of the at least one CSI-RS satisfies the CSI-RS CHO execution condition before the signal measurement results of the at least one SSB RS satisfies the SSB CHO based execution condition.

4. The device of claim 2, wherein the CSI-RS based random access condition is at least one of a desired signal received power threshold value or a desired signal quality threshold value.

5. The device of claim 2, wherein the device is further caused to perform the CHO by:
  performing random access of the at least one target cell using the at least one CSI-RS in response to results of the determination indicating the measured signal received power or signal quality of the at least one CSI-RS satisfies the CSI-RS random access condition.

6. The device of claim 2, wherein in response to the results of the determination indicating the measured signal received power or signal quality of the at least one CSI-RS do not satisfy the CSI-RS based random access condition, the device is further caused to:
  determine whether the signal measurement results of the at least one SSB RS satisfies the SSB based CHO execution condition; and
  perform the CHO by performing random access of the at least one target cell using at least one SSB corresponding to the at least one target cell in response to results of the determination indicating the SSB based CHO execution condition is satisfied.

7. The device of claim 1, wherein the device is further caused to:
  determine whether the signal measurement results of the at least one SSB RS satisfies the SSB based CHO execution condition before the signal measurement results of the at least one CSI-RS satisfies the CSI-RS based CHO execution condition;
  identify at least one SSB RS which corresponds to a subset of the SSB RS measurements for the target cell when the SSB based CHO execution condition is met; and
  determine whether the identified at least one SSB RS satisfies a SSB RS based random access condition.

8. The device of claim 7, wherein the SSB RS based random access condition is:
  the at least one SSB RS not being associated with a configured CSI-RS, or
  a signal received power or signal quality value of the CSI-RS associated with the at least one SSB RS is less than a desired threshold value.

9. The device of claim 7, wherein the device is further caused to perform the CHO by:
  performing random access of the at least one target cell in response to results of the determination indicating the at least one SSB RS satisfies the SSB RS based random access condition.

10. The device of claim 7, wherein, in response to the results of the determination indicating none of the identified SSB RS satisfies the SSB RS based random access condition, the device is further caused to:
  determine whether the signal measurements of the at least one CSI-RS satisfies the CSI-RS based CHO execution condition; and
  perform the CHO by performing random access of the at least one target cell in response to results of the determination indicating that the CSI-RS based CHO execution condition is satisfied.

11. A method of operating a user equipment (UE) device, the method comprising:
  receiving radio resource control (RRC) reconfiguration information from a source radio access network (RAN) node, the RRC reconfiguration information including a synchronization signal block (SSB) reference signal (RS) based conditional handover (CHO) execution condition associated with at least one target cell, and a channel state information reference signal (CSI-RS) based CHO execution condition associated with the at least one target cell;
  performing signal measurements of at least one SSB RS and at least one CSI-RS associated with the at least one target cell, the at least one CSI-RS associated with a contention-free random access resource; and
  performing the CHO with the at least one target cell based on the signal measurement results of the at least one SSB RS, the at least one CSI-RS, the SSB CHO based execution condition, and the CSI-RS based CHO execution condition, wherein
  in response to the SSB based CHO execution condition first being satisfied and to determining that at least one SSB based random access condition is not satisfied, not performing SSB based CHO execution and continuing to monitor the CSI-RS based execution condition.

12. The method of claim 11, further comprising:
  determining whether the signal measurement results of the at least one CSI-RS satisfies the CSI-RS based CHO execution condition;
  measuring signal received power or signal quality of the at least one CSI-RS of the at least one target cell in response to results of the determining indicating that the CSI-RS based CHO execution condition is satisfied; and
  determining whether the measured signal received power or signal quality of the at least one CSI-RS satisfies a CSI-RS based random access condition.

13. The method of claim 12, wherein the determining whether the signal measurement results of the CSI-RS CHO execution condition is satisfied further includes determining whether the signal measurement results of the at least one CSI-RS satisfies the CSI-RS CHO execution condition before the signal measurement results of the at least one SSB RS satisfies the SSB CHO based execution condition.

14. The method of claim 12, wherein the CSI-RS based random access condition is at least one of a desired signal received power threshold value or a desired signal quality threshold value.

15. The method of any one of claim 12, wherein the performing the CHO further includes:
  performing random access of the at least one target cell using the at least one CSI-RS in response to results of the determining indicating the measured signal received power or signal quality of the at least one CSI-RS satisfies the CSI-RS based random access condition.

16. The method of claim 12, wherein in response to the results of the determination indicating the measured signal received power or signal quality of the at least one CSI-RS do not satisfy the CSI-RS based random access condition, the method further comprises:
  determining whether the signal measurement results of the at least one SSB RS satisfies the SSB based CHO execution condition; and
  performing the CHO by random access of the at least one target cell using at least one SSB corresponding to the at least one target cell in response to results of the determining indicating the SSB based CHO execution condition is satisfied.

17. The method of claim 11, further comprising:
  determining whether the signal measurement results of the at least one SSB RS satisfies the SSB based CHO execution condition before the signal measurement results of the at least one CSI-RS satisfies the CSI-RS based CHO execution condition;

identifying at least one SSB RS which corresponds to a subset of the SSB RS measurements for the target cell when the SSB based CHO execution condition is met; and determining whether the identified at least one SSB RS satisfies a SSB RS based random access condition.

18. The method of claim 17, wherein the SSB RS based random access condition is:

the at least one SSB RS not being associated with a configured CSI-RS, or a signal received power or signal quality value of the CSI-RS associated with the at least one SSB RS is less than a desired threshold value.

19. A user equipment (UE) device comprising:

a memory storing computer readable instructions; and processing circuitry configured to execute the computer readable instructions to cause the device to, receive radio resource control (RRC) reconfiguration information from a source radio access network (RAN) node, the RRC reconfiguration information including a synchronization signal block (SSB) reference signal (RS) based conditional handover (CHO) execution condition associated with at least one target cell controlled by a target RAN node, and a channel state information reference signal (CSI-RS) based CHO execution condition associated with the at least one target cell, perform signal measurements of at least one SSB RS and at least one CSI-RS, the signal measurements associated with the at least one target cell, the at least one CSI-RS associated with a contention-free random access resource, and perform the CHO with the at least one target cell based on both the signal measurement results of the at least one SSB RS that is received from the target cell and the signal measurement results of the at least one CSI-RS that is received from the target cell, and based on both the SSB based CHO execution condition and the CSI-RS based CHO execution condition, wherein the performing the CHO includes, in response to the CSI-RI based CHO execution condition first being satisfied, performing the CHO using CSI-RSs, and in response to the SSB based CHO execution condition first being satisfied, determining whether at least one SSB based random access condition is satisfied by the measurement results of the at least one SSB, in response to the at least one SSB based random access condition being satisfied, performing the CHO using SSBs, and in response to the at a least one SSB based random access condition not being satisfied, continuing to monitor the CSI-RSI based CHO execution condition.

20. The UE device of claim 19, wherein the at least one SSB based random access condition is satisfied if, the UE detects a measurement result for a relevant SSB that is not associated with a configured CSI-RS, or the UE detects the measurement result for the relevant SSB that is associated with CSI-RS resources that are not detected.

* * * * *